United States Patent [19]
Bumpstead

[11] 3,863,845
[45] Feb. 4, 1975

[54] EMITTER FOR LOW RATE, LOW PRESSURE DISCHARGE OF IRRIGATING WATER

[75] Inventor: John G. Bumpstead, Glendora, Calif.

[73] Assignee: Rain Bird Sprinkler Mfg. Corp., Glendora, Calif.

[22] Filed: Mar. 18, 1974

[21] Appl. No.: 451,852

[52] U.S. Cl. ............... 239/542, 239/562, 239/588
[51] Int. Cl. ..................... B05b 15/00, B05b 1/14
[58] Field of Search ............ 239/76, 145, 542, 588, 239/390, 391, 548, 562, 563–565

[56] References Cited
UNITED STATES PATENTS

| 165,668 | 7/1875 | Galvin | 239/391 X |
|---|---|---|---|
| 2,598,961 | 6/1952 | Andrus | 239/562 X |
| 3,199,791 | 8/1965 | Chapin | 239/542 |
| 3,586,239 | 6/1971 | Blass | 239/542 X |
| 3,604,728 | 9/1971 | Symcha et al. | 239/542 UX |

Primary Examiner—Robert S. Ward, Jr.
Attorney, Agent, or Firm—Fulwider, Patton, Rieber, Lee & Utecht

[57] ABSTRACT

A water emitter for discharging water under relatively low pressure and at a relatively low rate from a source of water under considerably higher pressure, and for discharging the low pressure water at a plurality of selected areas remote from the source and at substantially uniform rates. The emitter includes a tubular core attachable to a supply pipe and a generally cylindrical casing surrounding a portion of the core and which cooperates with a helical rib formed around the core to define a pressure reducing helical path through which water from the source travels preparatory to discharge through a plurality of elongated flexible tubes communicating with an annular chamber around the core adjacent the outlet end of the helical path.

15 Claims, 4 Drawing Figures

PATENTED FEB 4 1975　　　　　　　　　　　　　　　3,863,845
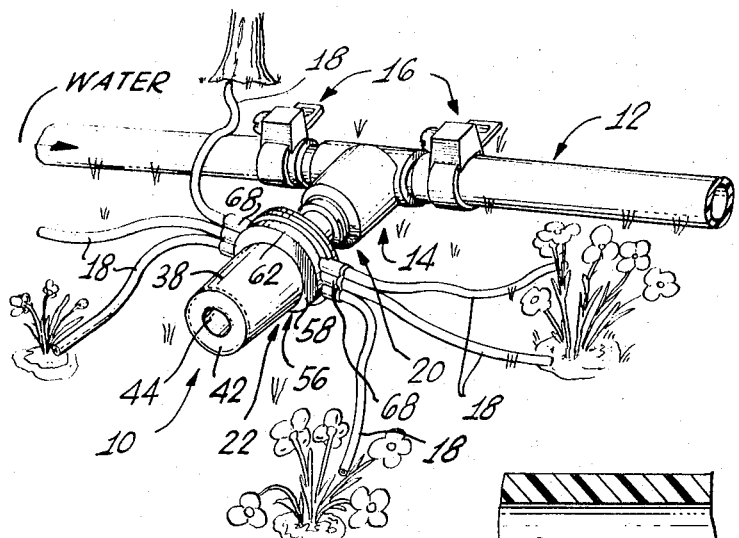
*fig.1*
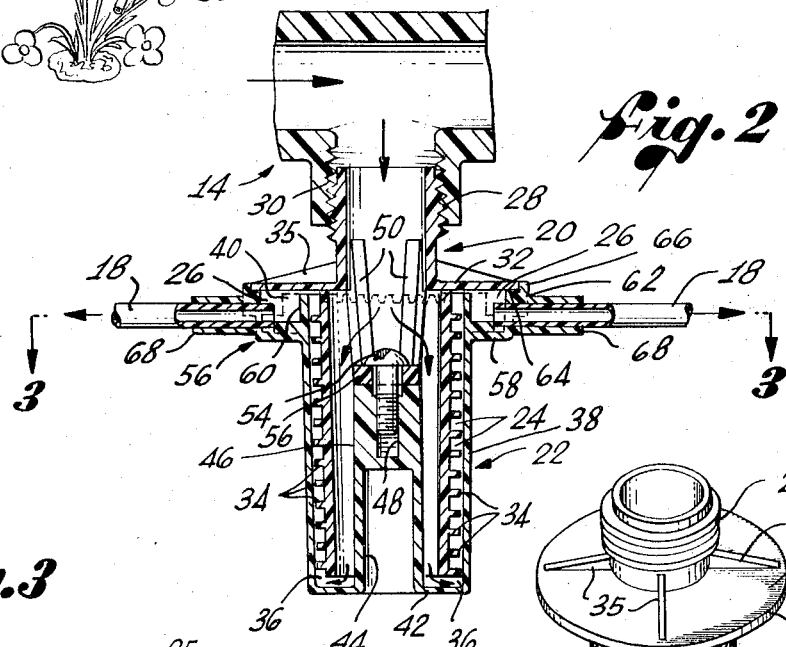
*fig.2*
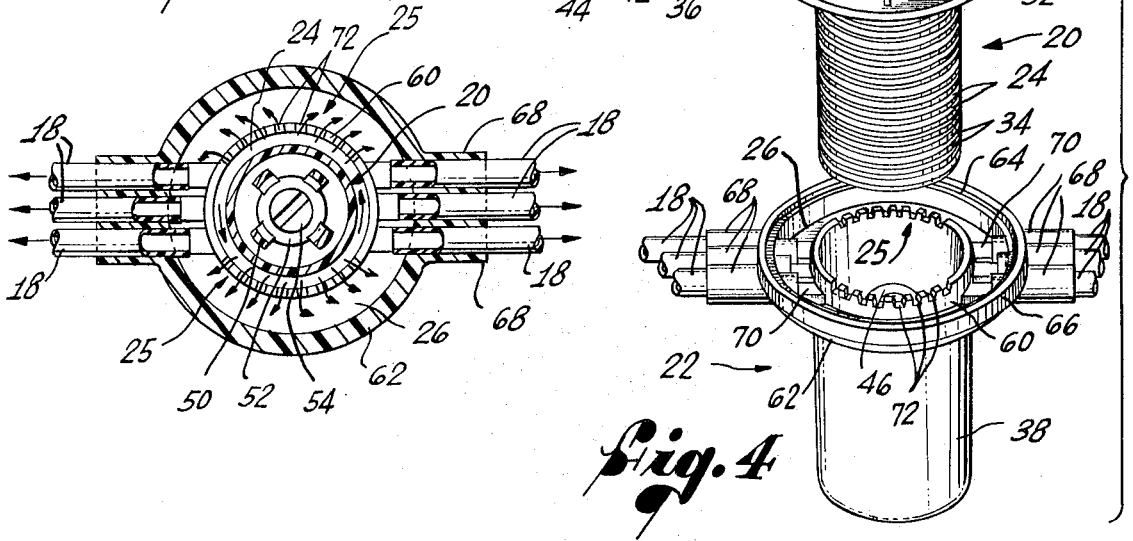
*fig.3*
*fig.4*

EMITTER FOR LOW RATE, LOW PRESSURE DISCHARGE OF IRRIGATING WATER

BACKGROUND OF THE INVENTION

This invention relates to irrigation devices for producing a low rate, low pressure discharge of water from a water supply of considerably higher pressure, and more particularly to a new and improved water emitter which discharges low pressure water to a number of preselected areas at a substantially uniform rate.

Numerous devices have been suggested in the prior art for providing low rate, low pressure discharge of water for irrigation of plants such as trees, shrubs, and the like. Typically, such devices provide means for reducing the pressure of water supplied to the device and for discharging water at a pressure substantially lower than that of the supply so that irrigating water can be applied over a long period and be soaked up by the soil without appreciable loss through run off.

Illustrative examples of such prior art devices can be found in the disclosures of U.S. Pat. No. 3,420,064 and U.S. Pat. No. 3,586,239. Each of those patents discloses an irrigation device which employs a pressure reducing helical path through which water must travel before discharge. In each of those devices, water is discharged directly upon reaching the end of the helical path, in the device disclosed in the U.S. Pat. No. 3,420,064, the discharge is a centralized drip-like trickle of water, and in the device disclosed in the U.S. Pat. No. 3,586,239, the discharge is a centralized low pressure spray.

While devices of the foregoing general types have met with some degree of commercial success, there exists a need for a water emitter which will provide a low rate, low pressure discharge to a plurality of preselected areas remote from the source of the irrigating water supply, and which will provide the low pressure discharge at a substantially uniform rate to each such area.

SUMMARY OF THE INVENTION

The present invention provides a simple, reliable, and effective water emitter which receives water from a source of relatively high pressure and discharges water at low rate and substantially reduced pressure to a plurality of preselected areas remote from the source, and which provides a substantially uniform discharge to each preselected area. Moreover, the emitter of the invention is inexpensive to manufacture, substantially leak free, and can be readily disassembled in the field should it become clogged or blocked with dirt, stones, or the like.

The emitter includes a generally cylindrical body portion formed of two interfitting members, and a plurality of elongated flexible discharge tubes through which reduced pressure water from the emitter is discharged. The emitter can be attached directly to a pressurized water supply pipe, and includes a helical or spiral path through which water from the supply must travel preparatory to discharge, the helical path serving to substantially reduce the water pressure prior to discharge.

To insure substantially uniform discharge through each tube, the body portion of the emitter includes an annular chamber which receives reduced pressure water after leaving the helical path and before entering the tubes, and baffle means are provided to dissipate swirling motion imparted to the water by the helical path before entering the annular chamber. By dissipating water swirl, a substantially equal amount of water enters each discharge tube from the annular chamber thereby producing a substantially uniform discharge through each tube.

More specifically, the two members constituting the body portion of the emitter comprise an inner tubular core having a raised helical rib around a portion thereof, and a generally cylindrical casing having an outer wall which fits around the rib of the core and cooperates therewith to define the helical path. The annular chamber is formed by an annulus around the core in the casing adjacent the outlet end of the helical path, and the baffle means comprise slots formed in the outer wall of the casing and through which water leaving the helical path must travel preparatory to entering the annular chamber.

The casing and core are preferably molded from a relatively rigid plastic, and are releasable secured together to permit relatively easy disassembly for cleaning. Further, the core and casing are secured together in such a manner that no potential leak paths from inside the emitter are present, and the tubes are formed from a relatively flexible material, preferably plastic, to permit them to be positioned wherever it is desired to have the low pressure water discharged.

Other features and advantages of the present invention will become more apparent from the following detailed description taken in conjunction with the drawings which disclose, by way of example, the principles of the invention.

DESCRIPTION OF THE DRAWINGS

FIG. 1 is a perspective view of a water emitter embodying the principles of the present invention, and shown attached to a water supply hose or pipe, illustrated in fragmentary perspective with the end portions removed, and with discharge tubes positioned with the outlet ends adjacent the bases of plants;

FIG. 2 is an enlarged fragmentary cross-ectional view of the emitter of FIG. 1 with end portions of the discharge tubes omitted for compact illustration;

FIG. 3 is a fragmentary cross-sectional view taken substantially along line 3—3 of FIG. 2; and FIG. 4 is an enlarged fragmentary exploded perspective view of the emitter of FIG. 1 and shown without its attachment to the supply pipe and with the end portions of the discharge tubes omitted for compact illustration.

DETAILED DESCRIPTION

As shown in the exemplary drawings, the present invention is embodied in a new and improved water emitter which provides a low rate, low pressure discharge of water for irrigation of plants such as trees and shrubs. In this instance, the body portion 10 of the emitter is shown projecting laterally from a supply hose or pipe 12 and is attached to the pipe through a T-shaped connector 14 secured between two sections of the pipe by adjustable band-type clamps 16. It should be noted that more than one such emitter may be attached to the pipe at spaced intervals along its length and that the specific form of attachment to the pipe constitutes no significant part of the present invention.

Water is supplied through the pipe 12 to the emitter at relatively high pressure and volume, and is discharged from the emitter body portion 10 through a number of elongated flexible tubes 18, preferably each of the same size and length, at a substantially reduced pressure and rate. Each of the tubes 18 is made of a flexible material such as pliable plastic, rubber, or the like, and is placed to discharge its water at a selected area away from the pipe, typically at the base of a plant so that the plant can receive low pressure and volume water flow over a long period of time thereby to permit the water to soak into the ground for deep root watering without appreciable water loss through run off.

In accordance with the present invention, the emitter is simple in construction, reliable in use, and assures a substantially constant rate of reduced pressure water flow through each of its discharge tubes 18 to the selected areas. Further, the emitter is inexpensive to manufacture and is substantially leak proof in operation, yet is capable of being readily disassembled for cleaning in the field should the emitter become clogged or blocked by dirt, stones, or the like.

Toward the foregoing ends, the body portion 10 of the emitter, which is preferably molded from a relatively rigid plastic material, includes a tubular core 20 which receives water from the pipe 12, and a generally cylindrical casing 22 which surrounds a portion of the core and cooperates with the core to form a helical or spiral path 24 through which water from the pipe travels to reduce its pressure before being discharged through the tubes 18. Each of the tubes 18 is attached to the casing 20 and communicates with an annular chamber 26 formed adjacent one end of the helical path 24, and substantially uniform discharge through each tube is insured by an arrangement of baffles 25 through which water leaving the helical path must pass preparatory to discharge through the tubes.

As shown in FIGS. 2 and 4, the core 20 has a generally cylindrical shape with a threaded end portion 28 adapted to be received by mating threads 30 in the connector 14 at the pipe 12. Spaced below the threaded portion 28 is a disk-like flange 32 projecting outwardly from, and surrounding the core 20, and a raised helical rib 34 extending from slightly below the flange to the lower end 36 of the core opposite the threaded portion. To strengthen the flange 32, re-enforcing struts 35 are provided between the top surface 37 of the flange and the body of the core 20.

An outer, generally cylindrical wall 38 of the casing 22 has an internal diameter substantially equal to the outer diameter of the rib 34 of the core 20, and, as shown in FIG. 2, surrounds the core between the bottom surface 40 of the flange 32 and a point below the lower end 36 of the core, thereby to enclose the rib and form the helical path 24. Formed integrally with the outer wall 38 of the casing 22 is a bottom wall 42 which overlies the lower end 36 of the core 20 and terminates inwardly in an upwardly projecting inner wall 44 of generally cylindrical shape.

To secure the casing 22 and core 20 together, the inner wall 44 of the casing includes a solid, generally cylindrical block 46 which has a threaded central aperture 48. Projecting downwardly from the inside of the core 20 are four struts 50 which taper inwardly to a centrally aperatured disk 52 which abuts the upper end of the block 46. A screw 54 inserted from the inside of the core 20 through the disk 52 and into the threaded aperture 48 in the block 46 releasably secures the core and casing together.

It should be noted that the screw 54 securing the core 20 to the casing 22 is located completely inside the body 10 of the emitter and no openings to the outside of the body portion are necessary to secure these components together. Thus, there is no potential leak path from inside the body 10 of the emitter occasioned by forming the core 20 and casing 22 of separate pieces. Moreover, to disassemble the body portion 10 of the emitter, all that is necessary is that the emitter be removed from the connector 14 to permit access to the screw 54, and removal of the screw to allow the core 20 and casing 22 to be separated.

Water enters the emitter from the pipe 12 through the connector 14 and flows centrally through the core 20 in a longitudinal direction as indicated by the arrows in FIG. 2, through the spaces between the struts 50, and is admitted into the helical path 24 defined between the ribs 34 beginning at the lower end 36 of the core. Water then travels back up around the core 20 along the narrow helical path 24 until it reaches the end of the rib 34 just below the flange 32.

By reason of the relatively long and narrow path length followed by the water during its travel through the helical path 24, a very substantial pressure drop takes place. Accordingly, when the water reaches the upper end of the helical path 24 as can be seen in FIG. 2, the water pressure is greatly reduced over its initial inlet pressure to the emitter from the pipe 12.

After reaching the end of its travel along the helical path 24 around the core 20, the reduced pressure water enters the annular chamber 26 located around the upper end portion of the helical path. As shown in FIGS. 2, 3 and 4, the annular chamber 26 herein is formed by an open ended annulus 56 around the upper end portion of the casing 22 and which includes a generally horizontal wall portion 58 projecting outwardly from the upper portion 60 of the outer wall 38 of the casing, and a generally vertical cylindrical wall portion 62 which projects upwardly from the end of the horizontal wall portion into sealing engagement with the flange 32.

In this instance, the annulus 56 is integrally formed with the casing 22, and the upper end of the vertical wall portion 62 includes an upstanding ring shaped lip 64 which can be pressed against the bottom surface 40 of the flange 32 to form a fluid seal. An outer rim 66 of the vertical wall portion 62 projects above the lip 64 and is dimensioned to have an inside diameter slightly larger than the diameter of the flange 32 so that the flange can be received inside the rim. When the casing 22 and core 20 are assembled, the upper end of the outer wall 38 abuts the bottom 40 of the flange 32 which seats within the rim 66 and closes the top of the annulus 56 thereby to enclose the annular chamber 26.

Each of the discharge tubes 18 projects through the vertical wall portion 62 of the annulus 56 defining the chamber 26, and herein there are three such tubes on each side of the annulus located in generally diametrical alignment across the body 10 of the emitter. The tubes 18 are held by cylindrical support sleeves 68 integrally formed with the vertical wall portion 62, and are friction fit into the sleeves by pushing the inlet ends of the tubes through the sleeves. Raised block-like projections 70 formed on the horizontal wall portion 58 of the annulus 56 function as stops to accurately locate the inlet ends of the tubes 18 in their support sleeves 68 so that the inlet ends project uniformly into the annular chamber 26.

As can be appreciated, water flowing around the core 20 along the helical path 24 acquires a spiral motion flow so that when the water reaches the end of its travel, it will have a tendency to continue in its spiral direction. It has been found that if this spiral condition were permitted to continue into the annular chamber 26, unequal flow through the tubes 18 would result since the water would tend to flow out one tube more than another. That is, water would tend to be directed out of the first discharge tube it encountered more than out of the second or third such tube.

In order to prevent unequal flow through the tubes 18, the arrangement of baffles 25 is provided to dissipate the spiral motion of the water entering the annular chamber 26. As best can be seen in FIGS. 3 and 4, the baffles are formed by providing spaced openings 72, in the end of the upper portion 60 of the outer wall 38 of the casing 22, these openings herein being in the form of slots having a generally rectangular shape and located on opposite sides of the casing between the two groups of discharge tubes 18.

In order for the spiraling water to enter the annular chamber 24, it must change its flow direction and pass radially through the slots 72. By reason of having to change its direction of flow, the spiral motion of the water is dissipated on entering the annular chamber 24, and the chamber simply fills like a reservoir and uniformly feeds each of the discharge tubes 18. Thus, the flow through each of the tubes 18 is substantially uniform and a low rate, low pressure discharge of water from the outlet ends of each tube is provided.

From the foregoing, it should be apparent that the emitter of the present invention is a reliable and effective device for providing a low pressure flow of water for irrigation, and that the emitter is simple in construction and inexpensive to manufacture. Further, the emitter is substantially leak proof in operation yet readily disassembled for cleaning and can be used where ever it is desired that water be supplied at a low rate, and low pressure from a source of water which is under considerably higher pressure.

While a particular form of the invention has been illustrated and described, it will be apparent that various modifications can be made without departing from the scope of the invention.

I claim:

1. An emitter for distributing water at a low rate and low pressure uniformly to a plurality of selected areas from a single water source of considerably higher pressure, said emitter comprising:
    a tubular core of generally cylindrical shape and adapted to be connected at one end to the water source for receiving water under relatively high pressure;
    a rib disposed in a helical configuration around a portion of said core and beginning adjacent the end of said core remote from said one end;
    a casing of generally cylindrical shape surrounding a portion of said core and cooperating with said rib to define a helical path having an inlet end and an outlet end;
    an annular chamber around said core adjacent said outlet end of said helical path;
    a plurality of elongated discharge tubes communicating with said annular chamber; and
    baffle means interposed between said outlet end of said helical path and said annular chamber for dissipating spiral motion of the water leaving said outlet end of said helical path and before entering said annular chamber.

2. An emitter as defined in claim 1 in which said core and said casing are formed of a relatively rigid plastic, and said tubes are each formed of a relatively flexible material.

3. An emitter as defined in claim 1 in which said annular chamber is formed by a closed annulus around said casing, and said baffle means comprise at least one opening in the wall of said annulus between said core and said annular chamber.

4. An emitter as defined in claim 3 wherein said core includes an annular flange spaced from said outlet end of said helical path, and said casing includes a generally cylindrical outer wall having one end abutting said flange, said outer wall defining said wall of said annulus between said core and said annular chamber.

5. An emitter for distributing water at a low rate and low pressure uniformly to a plurality of selected areas from a single source of water of relatively high pressure, said emitter comprising:
    a body portion coupled to the source and receiving water under relatively high pressure;
    means defining a helical path having inlet and outlet ends in said body portion and through which water from said source spirals to substantially reduce its pressure;
    an annular chamber in said body and receiving water from said outlet end of said helical path;
    a pluraltiy of elongated flexible tubes communicating with said annular chamber; and
    means for dissipating the spiral motion of the water leaving said helical path preparatory to discharge through said tubes, whereby said tubes each receive a substantially uniform amount of low pressure water from said chamber and distribute the water from said body portion at a substantially uniform rate and pressure through each of said tubes.

6. An emitter as defined in claim 5 in which said annular chamber is formed by a closed annulus surrounding the outlet end of said helical path, and said means for dissipating said spiral motion comprise a plurality of spaced openings between said outlet end of said helical path and said annular chamber and arranged to change the direction of water flow on entering said annular chamber.

7. An emitter as defined in claim 5 in which said body portion comprises a tubular core and a casing surrounding said core, and said means defining said helical path is disposed between said core and said casing.

8. An emitter as defined in claim 7 in which said core is generally cylindrical and said means defining said helical path includes a raised rib disposed in a helical configuration around said core and abutting the inside of said surrounding casing, said inlet end of said helical path being located adjacent one end of said core and said outlet end being located toward the end of said core remote from said one end.

9. An emitter as defined in claim 7 in which said casing and said core are releasably secured together from the inside of said body whereby there are no external openings through said core and casing through which undesirable water leakage can occur.

10. An emitter for providing a low rate, low pressure discharge of water from a water source of considerably higher pressure, said emitter comprising:

a tubular core adapted to be connected at one end to the water source for receiving water under relatively high pressure;

a generally cylindrical casing surrounding a portion of said core including the end of said core remote from said one end;

means between said core and said casing defining a helical path having an inlet end adjacent said end of said core remote from said one end, and an outlet end longitudinally spaced from said inlet end toward said one end, said means providing a substantial pressure drop in water traveling along said helical path with spiral motion between said inlet end and said outlet end;

means forming an annular chamber around said core adjacent said outlet end of said helical path;

a plurality of elongated discharge tubes communicating with said annular chamber; and means permitting water to enter said annular chamber from said outlet end of said helical path and for dissipating spiral motion of the water before discharge through said tubes whereby substantially uniform discharge through each of said tubes is achieved.

11. An emitter as defined in claim 10 in which said helical path is formed by a raised rib around said core and disposed between said core and said casing in a helical configuration, and said annular chamber is formed in a closed annulus separated from said outlet end of said helical path by a wall, and said means for permitting water to enter said annular chamber and for dissipating said spiral motion comprise openings through said wall.

12. An emitter as defined in claim 11 in which each of said discharge tubes communicate with said annular chamber at a place circumferentially spaced from said openings through said wall, whereby water passing through said openings must also move around said annular chamber prior to entering said tube.

13. An emitter as defined in claim 12 wherein said core includes a flange projecting outwardly therefrom adjacent the outlet end of said helical path, and said annulus is formed in said casing and includes walls engaging said flange to close said annulus and enclose said annular chamber.

14. An emitter as defined in claim 13 wherein said casing is releasably secured to said core, and said annulus includes a circumferential lip engaged with said flange for forming a fluid seal between core and casing.

15. An emitter as defined in claim 14 wherein said casing and said core are each formed of a relatively rigid plastic, and each of said tubes is formed of a relatively flexible material.

* * * * *